US011868066B2

(12) United States Patent
Furukawa et al.

(10) Patent No.: US 11,868,066 B2
(45) Date of Patent: Jan. 9, 2024

(54) INTERMEDIATE TRANSFER BELT, TRANSFER DEVICE, AND IMAGE FORMING APPARATUS

(71) Applicant: FUJIFILM Business Innovation Corp., Tokyo (JP)

(72) Inventors: Masato Furukawa, Kanagawa (JP); Masato Ono, Kanagawa (JP); Daisuke Tanemura, Kanagawa (JP); Hiroaki Tanaka, Kanagawa (JP); Yosuke Kubo, Kanagawa (JP); Iori Nishimura, Kanagawa (JP); Shigeru Fukuda, Kanagawa (JP); Masayuki Seko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/949,808

(22) Filed: Sep. 21, 2022

(65) Prior Publication Data

US 2023/0288845 A1 Sep. 14, 2023

(30) Foreign Application Priority Data

Mar. 10, 2022 (JP) ................................ 2022-037455

(51) Int. Cl.
*G03G 15/16* (2006.01)

(52) U.S. Cl.
CPC ....... *G03G 15/162* (2013.01); *G03G 15/1605* (2013.01); *G03G 2215/1623* (2013.01)

(58) Field of Classification Search
CPC ............. G03G 15/1605; G03G 15/162; G03G 2215/1623
See application file for complete search history.

(56) References Cited

U.S. PATENT DOCUMENTS

| | | | | |
|---|---|---|---|---|
| 6,016,417 A * | 1/2000 | Katsuno | G03G 15/162 | 399/308 |
| 2012/0201578 A1* | 8/2012 | Mashiko | G03G 15/162 | 399/308 |
| 2018/0149998 A1* | 5/2018 | Furukawa | B65H 23/046 | |

FOREIGN PATENT DOCUMENTS

| | | |
|---|---|---|
| JP | 2012-042656 A | 3/2012 |
| JP | 2021-086058 A | 6/2021 |

* cited by examiner

*Primary Examiner* — Joseph S Wong
(74) *Attorney, Agent, or Firm* — Sughrue Mion, PLLC

(57) ABSTRACT

An intermediate transfer belt includes a single-layer body including a resin layer or a multilayer body including the resin layer serving as a top surface layer. The surface of the resin layer has an arithmetic average surface height Sa of 0.005 μm or more and 0.020 μm or less. The surface of the resin layer has a maximum height Sz of 0.050 μm or more and 0.200 μm or less. The surface of the resin layer has recesses having a depth of 0.050 μm or more, the recesses being arranged at a regular interval, and the interval of the recesses is 0.20 μm or more and 0.80 μm or less.

20 Claims, 2 Drawing Sheets

INTERMEDIATE TRANSFER BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-037455 filed Mar. 10, 2022.

BACKGROUND

(i) Technical Field

The present disclosure relates to an intermediate transfer belt, a transfer device, and an image forming apparatus.

(ii) Related Art

Electrophotographic image forming apparatuses (e.g., a copying machine, a facsimile, and a printer) form an image by transferring a toner image formed on the surface of an image holding member onto the surface of a recording medium and fixing the toner image to the recording medium. When a toner image is transferred to a recording medium, for example, an intermediate transfer belt is used.

For example, Japanese Laid Open Patent Application Publication No. 2012-042656 discloses an intermediate transfer belt used in an image forming apparatus including a mechanism for applying a lubricant, wherein the surface of the intermediate transfer belt with which toner particles are to contact has an irregular shape having a surface roughness such that a maximum height roughness (Ry) satisfies $0.1\ \mu m < Ry < 20\ \mu m$ and an arithmetic average roughness (Ra) satisfies $0.05\ \mu m < Ra < 3\ \mu m$ and the width of the irregularities satisfies $0.05\ \mu m <$ width of irregularities $< 4\ \mu m$.

Japanese Laid Open Patent Application Publication No. 2021-086058 discloses an intermediate transfer body to which a toner image formed by developing a latent image formed on an image carrier with a toner is transferred. The intermediate transfer body includes a base layer and a surface layer that is disposed on the base layer and includes an energy ray curable resin. The surface layer has a plurality of local recesses that are formed in the surface so as to extend inside the surface layer and have a (major axis length/minor axis length) ratio of 3 or less. When the average interval of the local recesses is defined as L (μm), L is 0.5 μm or more and 100 μm or less.

SUMMARY

Aspects of non-limiting embodiments of the present disclosure relate to an intermediate transfer belt including a single-layer body including a resin layer or a multilayer body including the resin layer serving as a top surface layer, the intermediate transfer belt having excellent transfer efficiency and excellent cleanability compared with the case where any of the characteristics (1), (2), and (3A) below is not satisfied or the case where any of the characteristics (1), (2), and (3B) below is not satisfied.

Characteristic (1): The surface of the resin layer has an arithmetic average surface height Sa of 0.005 μm or more and 0.020 μm or less.

Characteristic (2): The surface of the resin layer has a maximum height Sz of 0.050 μm or more and 0.200 μm or less.

Characteristic (3A): The surface of the resin layer has recesses having a depth of 0.050 μm or more, the recesses being arranged at a regular interval, and the interval of the recesses is 0.20 μm or more and 0.80 μm or less.

Characteristic (3B): The surface of the resin layer has recesses having a depth of 0.050 μm or more, the recesses being arranged at a regular interval, and the ratio of the interval of the recesses to the depth of the recesses (recess interval/recess depth) is 1.0 or more and 16.0 or less.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an intermediate transfer belt including a single-layer body including a resin layer or a multilayer body including the resin layer serving as a top surface layer, wherein a surface of the resin layer has an arithmetic average surface height Sa of 0.005 μm or more and 0.020 μm or less, wherein the surface of the resin layer has a maximum height Sz of 0.050 μm or more and 0.200 μm or less, and wherein the surface of the resin layer has recesses having a depth of 0.050 μm or more, the recesses being arranged at a regular interval, and the interval of the recesses is 0.20 μm or more and 0.80 μm or less.

BRIEF DESCRIPTION OF THE DRAWINGS

Exemplary embodiments of the present disclosure will be described in detail based on the following figures, wherein.

DETAILED DESCRIPTION

Figure 1:
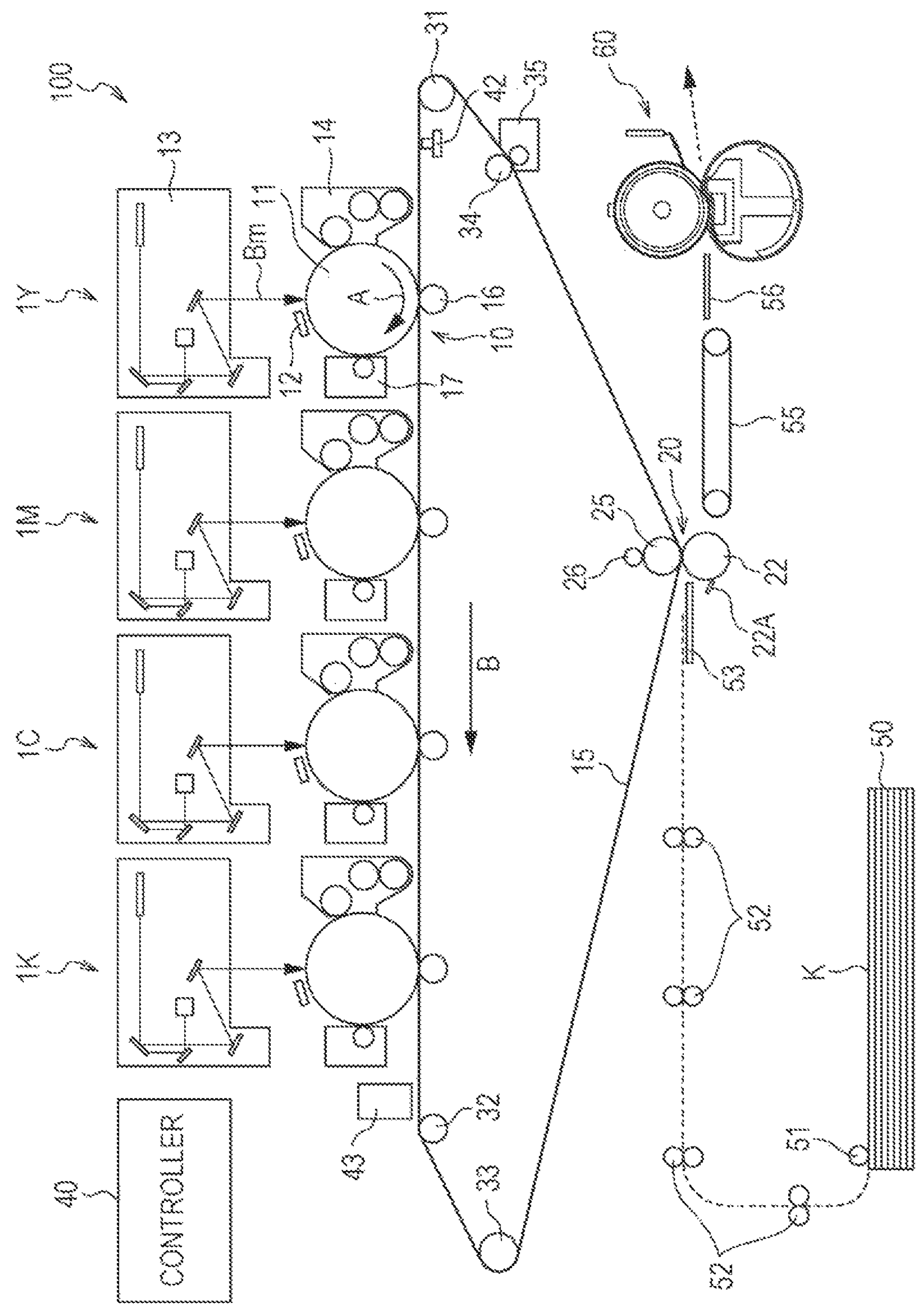
FIG. 1 is a schematic diagram illustrating an example of an image forming apparatus according to an exemplary embodiment.

Exemplary embodiments, which are examples of the present disclosure, are described below. The following description and Examples below are intended to be illustrative of the exemplary embodiments and not restrictive of the scope of the exemplary embodiments.

In the exemplary embodiments, when numerical ranges are described in a stepwise manner, the upper or lower limit of a numerical range may be replaced with the upper or lower limit of another numerical range, respectively. In the exemplary embodiments, the upper and lower limits of a numerical range may also be replaced with the values described in Examples below.

In the exemplary embodiments, the term “step” refers not only to an individual step but also to a step that is not distinguishable from other steps but achieves the intended purpose of the step.

In the exemplary embodiments, when the exemplary embodiments are described with reference to a drawing, the structure of the exemplary embodiments is not limited to the structure illustrated in the drawing. The sizes of the members illustrated in the attached drawing are conceptual and do not limit the relative relationship among the sizes of the members.

Each of the components described in the exemplary embodiments may include a plurality of types of substances that correspond to the component. In the exemplary embodiments, in the case where a composition includes a plurality of substances that correspond to a component of the composition, the content of the component in the composition is the total content of the plurality of substances in the composition unless otherwise specified.

Intermediate Transfer Belt

First Exemplary Embodiment

An intermediate transfer belt according to a first exemplary embodiment includes a single-layer body including a resin layer or a multilayer body including the resin layer serving as a top surface layer, wherein the surface of the resin layer has an arithmetic average surface height Sa of 0.005 μm or more and 0.020 μm or less, wherein the surface of the resin layer has a maximum height Sz of 0.050 μm or more and 0.200 μm or less, and wherein the surface of the resin layer has recesses having a depth of 0.050 μm or more, the recesses being arranged at a regular interval, and the interval of the recesses is 0.20 μm or more and 0.80 μm or less.

Second Exemplary Embodiment

An intermediate transfer belt according to a second exemplary embodiment includes a single-layer body including a resin layer or a multilayer body including the resin layer serving as a top surface layer, wherein the surface of the resin layer has an arithmetic average surface height Sa of 0.005 μm or more and 0.020 μm or less, wherein the surface of the resin layer has a maximum height Sz of 0.050 μm or more and 0.200 μm or less, and wherein the surface of the resin layer has recesses having a depth of 0.050 μm or more, the recesses being arranged at a regular interval, and the ratio of the interval of the recesses to the depth of the recesses (recess interval/recess depth) is 1.0 or more and 16.0 or less.

The intermediate transfer belts according to the first and second exemplary embodiments may have excellent transfer efficiency and excellent cleanability. The reasons are presumably as follows.

In the intermediate transfer belt according to the first exemplary embodiment, the arithmetic average surface height Sa and maximum height Sz of the surface of the resin layer, which constitutes the outer peripheral surface of the intermediate transfer belt, are adjusted to fall within the above ranges. Furthermore, deep recesses having a depth of 0.050 μm or more are formed in the above surface at a small interval. This reduces the true area of contact between the intermediate transfer belt and a toner, etc. and consequently reduces the physical adhesive force.

Similarly, in the intermediate transfer belt according to the second exemplary embodiment, the arithmetic average surface height Sa and maximum height Sz of the surface of the resin layer, which constitutes the outer peripheral surface of the intermediate transfer belt, are adjusted to fall within the above ranges. Furthermore, deep recesses having a depth of 0.050 μm or more are formed in the above surface at a small interval compared with the depth of the recesses. This reduces the true area of contact between the intermediate transfer belt and a toner, etc. and consequently reduces the physical adhesive force.

Since both of the intermediate transfer belts according to the first and second exemplary embodiments have a reduced physical adhesive force to a toner, etc., they may be also excellent in terms of transfer efficiency.

It is considered that the intermediate transfer belts according to the first and second exemplary embodiments may have excellent transfer efficiency and excellent cleanability because of the above-described structure.

An intermediate transfer belt that corresponds to both of the intermediate transfer belts according to the first and second exemplary embodiments (hereinafter, such an intermediate transfer belt is referred to also as "intermediate transfer belt according to this exemplary embodiment") is described in detail below. Note that an example of the intermediate transfer belt according to an exemplary embodiment of the present disclosure may be any intermediate transfer belt that corresponds to either of the intermediate transfer belts according to the first and second exemplary embodiments.

Layer Structure

The intermediate transfer belt according to this exemplary embodiment includes a single-layer body consisting of a resin layer or a multilayer body including the resin layer serving as a top surface layer.

That is, the intermediate transfer body according to this exemplary embodiment has an outer peripheral surface constituted by the resin layer.

In the case where the intermediate transfer belt according to this exemplary embodiment includes a multilayer body including a resin layer serving as a top surface layer, an intermediate transfer belt that includes a resin substrate layer and a resin layer disposed thereon is used. An intermediate layer (e.g., an elastic layer) may be interposed between the substrate layer and the resin layer.

The resin substrate layer and the intermediate layer (e.g., an elastic layer) may be known layers used for intermediate transfer belts.

Surface Qualities of Resin Layer

The resin layer has the surface qualities described below. In other words, the intermediate transfer belt according to this exemplary embodiment has the surface qualities described below.

Arithmetic Average Surface Height Sa

The arithmetic average surface height Sa of the surface of the resin layer is 0.005 μm or more and 0.020 μm or less. When the above arithmetic average surface height Sa falls within the above range, the true area of contact between the intermediate transfer belt and a toner, etc. is reduced, the physical adhesive force is reduced accordingly, and cleanability and transfer efficiency may be enhanced.

The arithmetic average surface height Sa of the surface of the resin layer is preferably 0.006 μm or more and 0.020 μm or less and is more preferably 0.008 μm or more and 0.020 μm or less in order to enhance cleanability and transfer efficiency.

The arithmetic average surface height Sa is measured in the following manner.

The arithmetic average surface height Sa is "arithmetical mean height of the 3D Sa" defined in ISO25178-2:2012, which is measured using a three-dimensional surface roughness profile adhering to ISO25178-2:2012. A specific measuring method is as described below.

A piece (sample) is taken. The shape of the surface of the piece is observed with an atomic force microscope "AFM5000" produced by Hitachi High-Tech Science Corporation. In the observation, a cantilever (SI-DF20) is used. The measurement range is set to 10 μm×10 μm. The observation is performed in a tapping mode to obtain an AFM image of the surface. The AFM image is constituted by 512×512 measurement points. A three-dimensional surface roughness profile can be obtained by performing curved surface correction of the entire image. Using the three-dimensional surface roughness profile, the arithmetic average height Sa can be calculated on the basis of the average of the absolute values of differences between the heights of the points and the average surface. The above measurement is conducted at 10 positions in the sample and the average thereof is used as an arithmetic average surface height Sa.

Maximum Height Sz

The maximum height Sz of the surface of the resin layer is 0.050 μm or more and 0.200 μm or less. When the above maximum height Sz falls within the above range, the true area of contact between the intermediate transfer belt and a toner, etc. is reduced, the physical adhesive force is reduced accordingly, and cleanability and transfer efficiency may be enhanced.

The maximum height Sz of the surface of the resin layer is preferably 0.050 μm or more and 0.200 μm or less in order to enhance cleanability and transfer efficiency.

The maximum height Sz is measured in the following manner.

The maximum height Sz is a concept created by applying the concept of maximum height Rz (linear maximum height) to a plane and is measured by a measuring method adhering to ISO25178-2:2012. As for a specific measuring method, an observation is performed using an atomic force microscope as in the measurement of the arithmetic average surface height Sa.

Regular Recesses

The surface of the resin layer has recesses formed therein at a regular interval (hereinafter, such recesses are referred to as "regular recesses").

The depth of the regular recesses is 0.050 μm or more.

The interval of the regular recesses is 0.20 μm or more and 0.80 μm or less.

The ratio of the interval of the regular recesses to the depth of the regular recesses (recess interval/recess depth) is 1.0 or more and 16.0 or less.

When the surface of the resin layer has regular recesses having a depth of 0.050 μm or more and an interval of 0.200 μm or more and 0.800 μm or less, the true area of contact between the intermediate transfer belt and a toner, etc. is reduced, the physical adhesive force is reduced accordingly, and cleanability and transfer efficiency may be enhanced.

When the surface of the resin layer has regular recesses having a depth of 0.050 μm or more and the ratio of the interval of the regular recesses to the depth of the regular recesses (recess interval/recess depth) is 1.5 or more and 16.0 or less, the true area of contact between the intermediate transfer belt and a toner, etc. is reduced, the physical adhesive force is reduced accordingly, and cleanability and transfer efficiency may be enhanced.

The depth of the regular recesses is preferably 0.050 μm or more and 0.200 μm or less, is more preferably 0.050 μm or more and 0.100 μm or less, and is further preferably 0.060 μm or more and 0.090 μm or less in order to enhance cleanability and transfer efficiency. If the depth of the regular recesses is excessively large, external additive particles and the like liberated from toner particles are likely to be buried in the recesses disadvantageously. Thus, the depth of the regular recesses preferably falls within the above range.

The interval of the regular recesses is preferably 0.25 μm or more and 0.80 μm or less and is more preferably 0.30 μm or more and 0.50 μm or less in order to enhance cleanability and transfer efficiency.

The ratio of the interval of the regular recesses to the depth of the regular recesses (recess interval/recess depth) is preferably 1.2 or more and 16.0 or less and is more preferably 1.5 or more and 10.0 or less in order to enhance cleanability and transfer efficiency.

The depth and interval of the regular recesses are measured in the following manner.

A piece (sample) is taken. The shape of the surface of the piece is observed with an atomic force microscope "AFM5000" produced by Hitachi High-Tech Science Corporation. In the observation, a cantilever (SI-DF20) is used. The measurement range is set to 10 μm×10 μm. The observation is performed in a tapping mode to obtain an AFM image of the surface. The AFM image is constituted by 512×512 measurement points. A three-dimensional surface roughness profile can be obtained by performing curved surface correction of the entire image. From the three-dimensional surface roughness profile, 512 cross-sectional curves are taken in a direction parallel to the horizontal direction (the axial direction of the intermediate transfer belt). The depth of the recesses is determined by measuring the absolute value of the minimum height of the recesses of the cross-sectional curves from the average surface. The interval of the recesses is determined by measuring the intervals between vertices of adjacent recesses and calculating the average of the intervals between the recesses present within a range having a width of 10 μm.

The surface qualities of the resin layer (i.e., the surface qualities of the outer peripheral surface of the intermediate transfer belt) are imparted by subjecting the surface of the resin layer to an ultraviolet irradiation treatment or an excimer laser irradiation treatment.

Modifying the uppermost surface of the resin layer by performing the ultraviolet irradiation treatment or the excimer laser irradiation treatment while controlling the irradiation conditions (i.e., intensity, the amount of time, the number of times the treatment is performed) under which the treatment is performed enables a fine irregular shape to be imparted while maintaining smoothness. Consequently, the above surface qualities can be imparted.

In the above treatment, the surface of the resin layer may become carbonized depending on the irradiation conditions. In such a case, the surface of the resin layer is washed subsequent to the surface treatment in order to achieve the intended surface qualities.

Structure of Resin Layer

The resin layer includes, for example, a resin and conductive carbon particles. The resin layer may include other components known in the related art as needed.

Examples of the resin include a polyimide resin (PI resin), a polyamide imide resin (PAI resin), an aromatic polyether ketone resin (e.g., aromatic polyether ether ketone resin), a polyphenylene sulfide resin (PPS resin), a polyether imide resin (PEI resin), a polyester resin, a polyamide resin, and a polycarbonate resin.

In consideration of mechanical strength and the dispersibility of the conductive carbon particles, the resin layer preferably includes at least one selected from the group consisting of a polyimide resin, a polyamide imide resin, an aromatic polyether ether ketone resin, a polyether imide resin, and a polyphenylene sulfide resin and more preferably includes at least one selected from the group consisting of a polyimide resin and a polyamide imide resin.

Since a polyimide resin and a polyamide imide resin (in particular, a polyimide resin) is capable of forming a resin layer having a high mechanical strength, even when the outer peripheral surface of the intermediate transfer belt is brought into contact with or slid over a contact member (e.g., a cleaning member or a second transfer member), the recesses and the like are unlikely to become flat. Consequently, the surface qualities can be maintained and it becomes easy to reduce the physical adhesive force to a toner, etc. As a result, it becomes easy to enhance cleanability and transfer efficiency.

Polyimide Resin

The polyimide resin may be, for example, a polyimide resin produced by imidization of a polyamic acid (i.e., precursor of the polyimide resin) produced by polymerization of a tetracarboxylic dianhydride with a diamine compound.

Examples of the polyimide resin include a resin including the structural unit represented by General Formula (I) below.

(I)

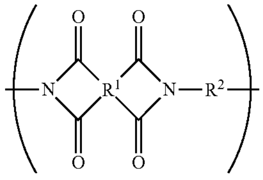

In General Formula (I), $R^1$ represents a tetravalent organic group, and $R^2$ includes a divalent organic group.

Examples of the tetravalent organic group represented by $R^1$ include an aromatic group, an aliphatic group, a cyclic aliphatic group, a group including an aromatic group and an aliphatic group, and the above groups that include a substituent. Specific examples of the tetravalent organic group include a residue of the tetracarboxylic dianhydride described below.

Examples of the divalent organic group represented by $R^2$ include an aromatic group, an aliphatic group, a cyclic aliphatic group, a group including an aromatic group and an aliphatic group, and the above groups that include a substituent. Specific examples of the divalent organic group include a residue of the diamine compound described below.

Specific examples of the tetracarboxylic dianhydride used as a raw material for the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracarboxylic dianhydride.

Specific examples of the diamine compound used as a raw material for the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminoprpoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

Polyamide Imide Resin

Examples of the polyamide imide resin include a resin having a repeating unit including an imide linkage and an amide linkage.

Specific examples of the polyamide imide resin include a polymer formed by polymerization of a trivalent carboxylic acid compound (i.e., tricarboxylic acid) including an acid anhydride group with a diisocyanate compound or a diamine compound.

Examples of the tricarboxylic acid include trimellitic anhydride and derivatives thereof. The tricarboxylic acid may be used in combination with a tetracarboxylic dianhydride, an aliphatic dicarboxylic acid, an aromatic dicarboxylic acid, or the like.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has a structure analogous to that of the above-described isocyanate and includes amino groups instead of isocyanato groups.

Resin Content

The content of the resin in the resin layer is preferably 60% by mass or more and 95% by mass or less, is more preferably 70% by mass or more and 95% by mass or less, and is further preferably 75% by mass or more and 90% by mass or less in consideration of mechanical strength, the adjustment of volume resistivity, and the like.

Conductive Carbon Particles

Examples of the conductive carbon particles include carbon black particles.

Examples of the carbon black include Ketjenblack, oil furnace black, channel black, and acetylene black. The carbon black particles may be carbon black particles the surfaces of which have been treated (hereinafter, such carbon black particles may be referred to as "surface treated carbon black particles").

The surface treated carbon black particles are produced by attaching a carboxyl group, a quinone group, a lactone group, a hydroxyl group, or the like to the surfaces of the carbon black particles. Examples of a method for treating the surfaces of the carbon black particles include an air oxidation method in which carbon black particles are contacted with air in a high temperature atmosphere; a method in which carbon black particles are caused to react with a nitrogen oxide or ozone at normal temperature (e.g., 22° C.);

and a method in which carbon black particles are subjected to air oxidation in a high temperature atmosphere and subsequently oxidized with ozone at a low temperature.

The average size of the conductive carbon particles is preferably 2 nm or more and 40 nm or less, is more preferably 9 nm or more and 25 nm or less, and is further preferably 9 nm or more and 15 nm or less in consideration of dispersibility, mechanical strength, volume resistivity, film formability, and the like.

In particular, in the case where the average size of the conductive carbon particles is 9 nm or more and 25 nm or less, when the above surface qualities are imparted to the surface of the resin layer, since uniform dispersion is achieved in the uppermost surface, an imbalance in electric charge of the surface can be avoided and, consequently, transfer efficiency may be enhanced.

The average size of the conductive carbon particles is measured by the following method.

First, a sample having a thickness of 100 nm is taken from the resin layer with a microtome. The sample is observed with a transmission electron microscope (TEM). For each of 50 conductive carbon particles, the diameter of a circle having an area equal to the projected area of the conductive carbon particle, that is, the equivalent circle diameter of the conductive carbon particle, is calculated as the size of the conductive carbon particle. The average of the sizes of the 50 conductive carbon particles is considered as the average size of the conductive carbon particles.

The content of the conductive carbon particles in the resin layer is preferably 8% by mass or more and 50% by mass or less and is more preferably 8% by mass or more and 30% by mass or less in consideration of mechanical strength and volume resistivity.

Other Components

Examples of the other components include a conductant agent other than the conductive carbon particles; a filler that increases mechanical strength; an antioxidant that reduces the thermal degradation of the belt; a surfactant that enhances flowability; and a heat aging inhibitor.

In the case where the resin layer includes the other components, the content of the other components in the resin layer is preferably more than 0% by mass and 10% by mass or less, is more preferably more than 0% by mass and 5% by mass or less, and is further preferably more than 0% by mass and 1% by mass or less.

Thickness of Resin Layer

In the case where the intermediate transfer belt is a single-layer body consisting of a resin layer, the thickness of the resin layer is preferably 60 μm or more and 120 μm or less and is more preferably 60 μm or more and 110 μm or less in consideration of mechanical strength.

In the case where the intermediate transfer belt is a multilayer body including the resin layer serving as a top surface layer, the thickness of the resin layer is preferably 1 μm or more and 70 μm or less and is more preferably 3 μm or more and 70 μm or less in consideration of productivity and reduction in electric discharge.

The thickness of the resin layer is measured in the following manner.

Specifically, a cross section of the resin layer in the thickness direction is observed with an optical microscope or a scanning electron microscope. The thickness of the layer that is to be measured is measured at ten positions, and the average thereof is considered as the thickness of the layer.

Volume Resistivity of Intermediate Transfer Belt

The common logarithm of the volume resistivity of the intermediate transfer belt which is measured when a voltage of 100 V is applied to the intermediate transfer belt for 10 seconds is preferably 8.0 log Ω·cm or more and 13.5 log Ω·cm or less and is more preferably 8.5 log Ω·cm or more and 13.2 log Ω·cm or less in consideration of transfer efficiency.

The volume resistivity of the intermediate transfer belt which is measured when a voltage of 100 V is applied to the intermediate transfer belt for 10 seconds is determined by the following method.

The volume resistivity (log Ω·cm) of the intermediate transfer belt is measured using a micro current meter "R8430A" produced by Advantest Corporation as a resistance meter and a UR probe produced by Mitsubishi Chemical Analytech Co., Ltd. as a probe at the center and both edges of the intermediate transfer belt in the width direction for each of 6 positions spaced at regular intervals in the circumferential direction, that is, 18 positions in total, with an applied voltage of 100 V, a voltage application time of 10 seconds, and a pressure of 1 kgf. The average of the resistivity values measured is calculated. The above measurement is conducted at 22° C. and 55% RH.

Surface Resistivity of Intermediate Transfer Belt

The common logarithm of the surface resistivity of the intermediate transfer belt which is measured when a voltage of 100 V is applied to the outer peripheral surface of the intermediate transfer belt for 10 seconds is preferably 9.5 log Ω/sq. or more and 15.0 log Ω/sq. or less, is more preferably 10.5 log Ω/sq. or more and 14.0 log Ω/sq. or less, and is particularly preferably 11.0 log Ω/sq. or more and 13.5 log Ω/sq. or less in consideration of the efficiency of transfer to a paper sheet having irregularities.

The unit of surface resistivity "log Ω/sq." expresses surface resistivity in terms of the logarithm of resistance per unit area and is denoted also as, for example, log(Ω/sq.), log Ω/square, or log Ω/□.

The surface resistivity of the intermediate transfer belt which is measured when a voltage of 100 V is applied to the outer peripheral surface of the intermediate transfer belt for 10 seconds is determined by the following method.

The surface resistivity (log Ω/sq.) of the outer peripheral surface of the intermediate transfer belt is measured using a micro current meter "R8430A" produced by Advantest Corporation as a resistance meter and a UR probe produced by Mitsubishi Chemical Analytech Co., Ltd. as a probe at the center and both edges of the outer peripheral surface of the intermediate transfer belt in the width direction for each of 6 positions spaced at regular intervals in the circumferential direction, that is, 18 positions in total, with an applied voltage of 100 V, a voltage application time of 10 seconds, and a pressure of 1 kgf. The average of the resistivity values measured is calculated. The above measurement is conducted at 22° C. and 55% RH.

Surface Hardness of Intermediate Transfer Belt

The surface hardness of the intermediate transfer belt which is measured by a nanoindentation method is preferably 5,000 MPa or more in order to maintain the shape of the recesses even when the outer peripheral surface of the intermediate transfer belt is brought into contact with or slid over a contact member (e.g., a cleaning member or a second transfer member). Increasing the above surface hardness reduces abrasion and deformation of the recesses. Consequently, the surface shape may be maintained and the physical adhesive force to a toner, etc. may be reduced. The upper limit for the surface hardness is, for example, 10,000 MPa (preferably 8,000 MPa).

The surface hardness of the intermediate transfer belt is a surface hardness measured by a nanoindentation method using a nanoindenter "HM500" produced by Fischer Instruments K.K. Specifically, the hardness of a target surface of a sample that is to be measured is measured using a Berkovich tip at a specific measurement temperature (25° C.) with a maximum indentation depth of 0.5 μm at 3 random positions, and the average thereof is calculated.

Method for Producing Intermediate Transfer Belt

A method for producing the intermediate transfer belt according to this exemplary embodiment includes, for example:

a step of applying a resin solution including the resin or a precursor of the resin and the conductive carbon particles onto the surface of a die to form a coating film;

a step of drying the coating film by heating and, as needed, causing a reaction of the precursor (e.g., in the case where a precursor of a polyimide resin or polyamide imide resin is used, imidization) to form a resin layer;

a step of releasing the resin layer from the die; and a step of subjecting the surface (i.e., the outer peripheral surface) of the resin layer to an ultraviolet irradiation treatment or excimer laser irradiation treatment before or after the resin layer is released from the die.

The die is not limited. A cylindrical die may be suitably used. The substrate may be a metal substrate. As a die, a die made of a material other than a metal, such as a resin, glass, or a ceramic, may be used instead. A glass coating, a ceramic coating, or the like may be optionally deposited on the surface of the die. A release agent, such as a silicone release agent or a fluorine release agent, may be applied to the die.

Examples of the method for the application of the resin solution include the following common coating methods: blade coating, wire bar coating, spray coating, dip coating, bead coating, air knife coating, and curtain coating.

Transfer Device

A transfer device according to an exemplary embodiment includes an intermediate transfer belt having an outer peripheral surface onto which a toner image is transferred; a first transfer device including a first transfer member that transfers a toner image formed on the surface of an image holding member onto the outer peripheral surface of the intermediate transfer belt as first transfer; a second transfer device including a second transfer member arranged to contact with the outer peripheral surface of the intermediate transfer belt, the second transfer member transferring the toner image transferred on the outer peripheral surface of the intermediate transfer belt onto the surface of a recording medium as second transfer; and a cleaning device including a cleaning member that cleans the outer peripheral surface of the intermediate transfer belt. Furthermore, the intermediate transfer belt according to the above-described exemplary embodiment is used as an intermediate transfer belt.

In the first transfer device, the first transfer member is arranged to face the image holding member across the intermediate transfer belt. In the first transfer device, the first transfer member applies a voltage having a polarity opposite to the polarity in which the toner is charged to the intermediate transfer belt. This causes the toner image to be first-transferred onto the outer peripheral surface of the intermediate transfer belt.

In the second transfer device, the second transfer member is disposed on a side of the intermediate transfer belt on which the toner image is held. The second transfer device includes, for example, in addition to the second transfer member, a backing member disposed on a side of the intermediate transfer belt which is opposite to the side on which the toner image is held. In the second transfer device, the intermediate transfer belt and a recording medium are sandwiched between the second transfer member and the backing member to form a transfer electric field. This causes the toner image present on the intermediate transfer belt to be second-transferred to the recording medium.

The second transfer member may be either a second transfer roller or a second transfer belt. The backing member is, for example, a back roller.

In the cleaning device, the cleaning member is disposed on a side of the intermediate transfer belt on which the toner image is held. The cleaning device includes, for example, in addition to the cleaning member, a backing member disposed on a side of the intermediate transfer belt which is opposite to the side on which the toner image is held. In the cleaning device, for example, while the intermediate transfer belt is sandwiched between the cleaning member and the backing member, the cleaning member cleans the outer peripheral surface of the intermediate transfer belt.

Examples of the cleaning member include a cleaning blade and a cleaning brush.

The transfer device according to this exemplary embodiment may be a transfer device that transfers a toner image onto the surface of a recording medium with a plurality of intermediate transfer bodies. That is, the transfer device may be, for example, a transfer device that first-transfers a toner image from an image holding member to a first intermediate transfer body, second-transfers the toner image from the first intermediate transfer body to a second intermediate transfer body, and third-transfers the toner image from the second intermediate transfer body to a recording medium.

At least one of the intermediate transfer bodies included in the above transfer device is the intermediate transfer belt according to the above-described exemplary embodiment.

Image Forming Apparatus

An image forming apparatus according to an exemplary embodiment includes a toner image formation device that forms a toner image on the surface of an image holding member and a transfer device that transfers the toner image formed on the surface of the image holding member onto the surface of a recording medium. The transfer device is the transfer device according to the above-described exemplary embodiment.

An example of the toner image formation device is a device that includes an image holding member, a charging device that charges the surface of the image holding member, an electrostatic latent image formation device that forms an electrostatic latent image on the charged surface of the image holding member, and a developing device that develops the electrostatic latent image formed on the surface of the image holding member using a developer including a toner to form a toner image.

The image forming apparatus according to this exemplary embodiment may be implemented as any of the following known image forming apparatuses: an image forming apparatus that includes a fixing unit that fixes the toner image transferred on the surface of the recording medium; an image forming apparatus that includes a cleaning unit that cleans the surface of the image holding member after the toner image has been transferred and before the image holding member is charged; an image forming apparatus that includes an erasing unit that irradiates, with erasing light, the surface of the image holding member after the toner image has been transferred and before the image holding member is charged in order to erase charge; and an image forming apparatus that includes an image holding member-heating member that heats the image holding member in order to lower the relative temperature.

The image forming apparatus according to this exemplary embodiment may be either a dry-developing image forming apparatus or a wet-developing image forming apparatus in which a liquid developer is used for developing images.

In the image forming apparatus according to this exemplary embodiment, for example, a portion including the image holding member may have a cartridge structure, that is, may be a process cartridge, which is detachably attachable to the image forming apparatus. The process cartridge may be, for example, a process cartridge that includes the toner image formation device and the transfer device.

An example of the image forming apparatus according to the exemplary embodiment is described below with reference to the attached drawing. Note that the image forming apparatus according to the exemplary embodiment is not limited to this. Only the components illustrated in the drawings are described below, and the descriptions of the other components are omitted.

Image Forming Apparatus

FIG. 1 is a schematic diagram illustrating the image forming apparatus according to the exemplary embodiment.

An image forming apparatus 100 according to the exemplary embodiment is, for example, an intermediate-transfer image forming apparatus illustrated in Figure, which is commonly referred to as a tandem image forming apparatus. The image forming apparatus 100 includes a plurality of image forming units 1Y, 1M, 1C, and 1K (examples of a toner image formation device) that form yellow (Y), magenta (M), cyan (C), and black (K) toner images by an electrophotographic system; a first transfer section 10 in which the yellow, magenta, cyan, and black toner images formed by the image forming units 1Y, 1M, 1C, and 1K are sequentially transferred (first transfer) to an intermediate transfer belt 15; a second transfer section 20 in which the superimposed toner images transferred on the intermediate transfer belt 15 are collectively transferred (second transfer) to a paper sheet K; and a fixing device 60 that fixes the image transferred on the paper sheet K by second transfer to the paper sheet K. The image forming apparatus 100 also includes a controller 40 that controls the operation of each of the devices and the sections.

Each of the image forming units 1Y, 1M, 1C, and 1K included in the image forming apparatus 100 includes a photosensitive member 11 (an example of the image holding member) that rotates in the direction of the arrow A, which holds a toner image formed on the surface.

The photosensitive member 11 is provided with a charger 12 (an example of the charging unit) and a laser exposure machine 13 (an example of the latent image forming unit) which are disposed on the periphery of the photosensitive member 11. The charger 12 charges the photosensitive member 11. The laser exposure machine 13 writes an electrostatic latent image on the photosensitive member 11 (in Figure, an exposure beam is denoted with Bm).

The photosensitive member 11 is also provided with a developing machine 14 (an example of the developing unit) and a first transfer roller 16 which are disposed on the periphery of the photosensitive member 11. The developing machine 14 includes a yellow, magenta, cyan, or black toner and visualizes the electrostatic latent image formed on the photosensitive member 11 with the toner. The first transfer roller 16 transfers the yellow, magenta, cyan, or black toner image formed on the photosensitive member 11 to the intermediate transfer belt 15 in the first transfer section 10.

The photosensitive member 11 is further provided with a photosensitive member cleaner 17 disposed on the periphery of the photosensitive member 11. The photosensitive member cleaner 17 removes toner particles remaining on the photosensitive member 11. The above-described electrophotographic devices, that is, the charger 12, the laser exposure machine 13, the developing machine 14, the first transfer roller 16, and photosensitive member cleaner 17, are sequentially arranged on the periphery of the photosensitive member 11 in the direction of the rotation of the photosensitive member 11. The image forming units 1Y, 1M, 1C, and 1K are arranged in a substantially linear manner in the order of yellow (Y), magenta (M), cyan (C), and black (K) in the direction of the rotation of the intermediate transfer belt 15.

The intermediate transfer belt 15 is driven in a circulatory manner (i.e., rotated), by various types of rollers at an intended speed in the direction of the arrow B illustrated in Figure. The various types of rollers include a driving roller 31 that is driven by a highly-constant-speed motor (not illustrated) and rotates the intermediate transfer belt 15; a support roller 32 that supports the intermediate transfer belt 15 that extends in a substantially linear manner in the direction in which the photosensitive members 11 are arranged; a tension roller 33 that applies tension to the intermediate transfer belt 15 and serves as a correction roller that prevents meandering of the intermediate transfer belt 15; a backing roller 25 disposed in the second transfer section 20; and a cleaning backing roller 34 disposed on a cleaning section in which toner particles remaining on the intermediate transfer belt 15 are scraped off.

The first transfer section 10 is constituted by first transfer rollers 16 that are arranged to face the respective photosensitive members 11 across the intermediate transfer belt 15. The first transfer rollers 16 are arranged to be in pressure contact with the photosensitive members 11 with the intermediate transfer belt 15 interposed between the first transfer rollers 16 and the photosensitive members 11. The first transfer rollers 16 are supplied with a voltage (first transfer bias) having a polarity opposite to the polarity (negative; the same applies hereinafter) of charged toner particles. Accordingly, toner images formed on the photosensitive members 11 are electrostatically attracted to the intermediate transfer belt 15 sequentially to form superimposed toner images on the intermediate transfer belt 15.

The second transfer section 20 is constituted by the backing roller 25 and a second transfer roller 22 disposed on a side of the intermediate transfer belt 15 on which the toner image is held.

The backing roller 25 has a surface resistivity of $1\times10^{7}\Omega/\square$ or more and $1\times10^{10}\Omega/\square$ or less. The degree of hardness of the backing roller 25 is set to, for example, 70° ("ASKER C" produced by KOBUNSHI KEIKI CO., LTD.; the same applies hereinafter). The backing roller 25 is disposed on the rear surface-side of the intermediate transfer belt 15 and serves as a counter electrode for the second transfer roller 22. The backing roller 25 is provided with a power supplying roller 26 made of a metal, through which a second transfer bias is applied in a consistent manner.

The second transfer roller 22 is a hollow cylindrical roller having a volume resistivity of $10^{7.5}$ Ωcm or more and $10^{8.5}$ Ωcm or less. The second transfer roller 22 is arranged to be in pressure contact with the backing roller 25 with the intermediate transfer belt 15 interposed between the second transfer roller 22 and the backing roller 25. The second transfer roller 22 is grounded. A second transfer bias is formed between the second transfer roller 22 and the backing roller 25. Accordingly, the toner image is transferred (second transfer) to a paper sheet K transported to the second transfer section 20.

An intermediate transfer belt cleaning member 35 is disposed on the intermediate transfer belt 15 at a position downstream of the second transfer section 20 such that the distance between the intermediate transfer belt cleaning member 35 and the intermediate transfer belt 15 can be changed. The intermediate transfer belt cleaning member 35 removes toner particles and paper dust particles that remain on the intermediate transfer belt 15 subsequent to the second transfer and cleans the outer peripheral surface of the intermediate transfer belt 15.

A second transfer roller cleaning member 22A is disposed on the second transfer roller 22 at a position downstream of the second transfer section 20. The second transfer roller cleaning member 22A removes toner particles and paper dust particles that remain on the second transfer roller 22 subsequent to the second transfer and cleans the outer peripheral surface of the intermediate transfer belt 15. An example of the second transfer roller cleaning member 22A is a cleaning blade. Alternatively, a cleaning roller may be used.

The intermediate transfer belt 15, the first transfer roller 16, the second transfer roller 22, and the intermediate transfer belt cleaning member 35 correspond to examples of the transfer device.

Figure 2:
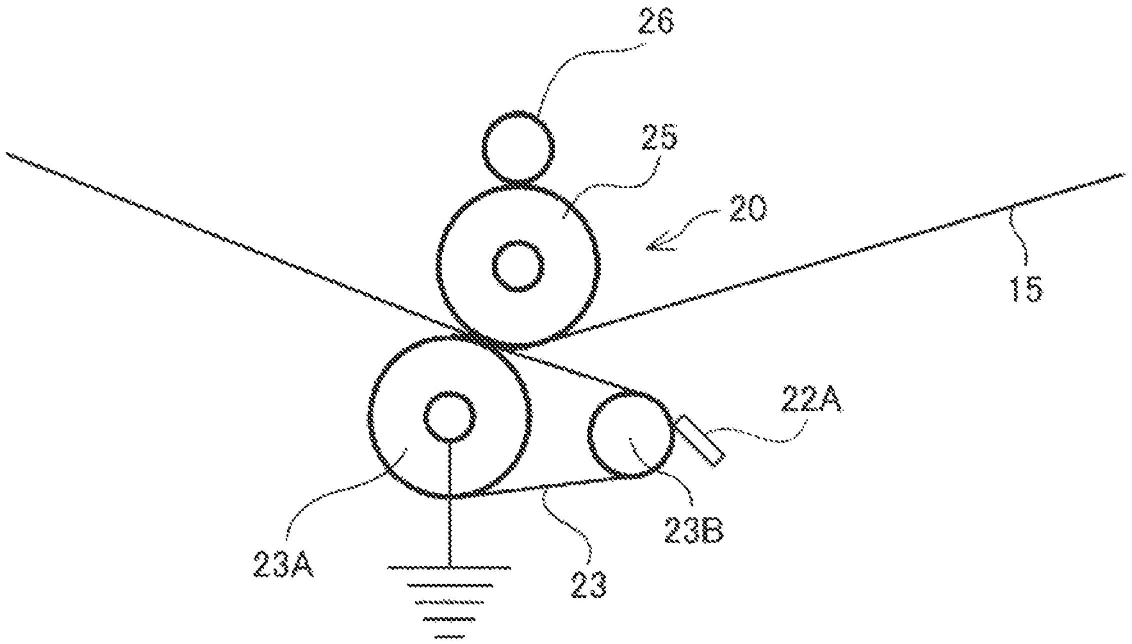
FIG. 2 is a schematic diagram illustrating the periphery of a second transfer section included in another example of the image forming apparatus according to the exemplary embodiment.

The image forming apparatus 100 may include a second transfer belt (an example of the second transfer member) instead of the second transfer roller 22. Specifically, the image forming apparatus 100 may include a second transfer device that includes a second transfer belt 23, a driving roller 23A arranged to face the backing roller 25 across the intermediate transfer belt 15 and the second transfer belt 23, and an idler roller 23B that enables, together with the driving roller 23A, the second transfer belt 23 to lay across in a tensioned state as illustrated in FIG. 2.

A reference sensor (home position sensor) 42 is disposed upstream of the yellow image forming unit 1Y. The reference sensor (home position sensor) 42 generates a reference signal used as a reference to determine the timings at which images are formed in the image forming units 1Y, 1M, 1C, and 1K. An image density sensor 43 is disposed downstream of the black image forming unit 1K. The image density sensor 43 is used for adjusting image quality. The reference sensor 42 generates the reference signal upon recognizing a mark disposed on the back side of the intermediate transfer belt 15. Upon recognizing the reference signal, the controller 40 sends a command to the image forming units 1Y, 1M, 1C, and 1K. Each of the image forming units 1Y, 1M, 1C, and 1K starts forming an image in accordance with the command.

The image forming apparatus according to the exemplary embodiment further includes the following components as units for transporting paper sheets K: a paper tray 50 that contains paper sheets K; a paper feed roller 51 that draws and transports a paper sheet K stocked in the paper tray 50 at predetermined timings; transport rollers 52 that transport the paper sheet K drawn by the paper feed roller 51; a transport guide 53 with which the paper sheet K transported by the transport rollers 52 is fed into the second transfer section 20; a transport belt 55 that transports the paper sheet K that has been subjected to the second transfer with the second transfer roller 22 to the fixing device 60; and a fixing entrance guide 56 with which the paper sheet K is introduced into the fixing device 60.

A fundamental process for forming an image using the image forming apparatus according to the exemplary embodiment is described below.

In image forming apparatus according to the exemplary embodiment, image data sent from an image reading apparatus (not illustrated), a personal computer (PC, not illustrated), or the like are subjected to image processing using an image processing apparatus (not illustrated) and, subsequently, the image forming units 1Y, 1M, 1C, and 1K form images.

In the image processing apparatus, the input reflectance data are subjected to image processing that includes various types of image editing, such as shading correction, misalignment correction, lightness/color space conversion, gamma correction, frame removal, color editing, and image moving. The image data that have been subjected to the image processing are converted into yellow, magenta, cyan, and black colorant gradation data and sent to the laser exposure machines 13.

In accordance with the colorant gradation data received by each of the laser exposure machines 13, the laser exposure machine 13 irradiates the photosensitive member 11 included in each of the image forming units 1Y, 1M, 1C, and 1K with an exposure beam Bm emitted from a semiconductor laser or the like. After the surface of the photosensitive member 11 of each of the image forming units 1Y, 1M, 1C, and 1K has been charged by the charger 12, the surface of the photosensitive member 11 is scanned by the laser exposure machine 13 and exposed to the beam and, consequently, an electrostatic latent image is formed on the surface of the photosensitive member 11. The electrostatic latent image is developed in each of the image forming units 1Y, 1M, 1C, and 1K as Y, M, C, or K toner image.

The toner images formed on the photosensitive members 11 of the image forming units 1Y, 1M, 1C, and 1K are transferred to the intermediate transfer belt 15 in the first transfer section 10 in which the photosensitive members 11 contact with the intermediate transfer belt 15. Specifically, in the first transfer section 10, the first transfer rollers 16 apply a voltage (first transfer bias) having a polarity opposite to the polarity (negative) of charged toner particles to the base of the intermediate transfer belt 15 and the toner images are sequentially superimposed on the outer peripheral surface of the intermediate transfer belt 15 (first transfer).

After the toner images have been sequentially transferred (first transfer) onto the outer peripheral surface of the intermediate transfer belt 15, the intermediate transfer belt 15 is moved and the toner images are transported to the second transfer section 20. When the toner images are transported to the second transfer section 20, in the transport unit, the paper feed roller 51 starts rotating and feeds a paper sheet K having an intended size from the paper tray 50 in synchronization with the transportation of the toner images to the second transfer section 20. The paper sheet K fed by the paper feed roller 51 is transported by the transport rollers 52 and reaches the second transfer section 20 through the transport guide 53. Before the paper sheet K reaches the second transfer section 20, the feeding of the paper sheet K is temporarily paused and an alignment between the paper sheet K and the toner images is made by an alignment roller (not illustrated) being rotated in synchronization with the movement of the intermediate transfer belt 15 on which the toner images are held.

In the second transfer section 20, the second transfer roller 22 is pressed by the backing roller 25 with the intermediate transfer belt 15 interposed between the second transfer roller 22 and the backing roller 25. The paper sheet K transported to the second transfer section 20 at the intended timing becomes inserted between the intermediate transfer belt 15 and the second transfer roller 22. Upon a voltage (second transfer bias) having a polarity that is the same as the polarity (negative) of charged toner particles being applied by the power supplying roller 26, a transfer electric field is generated between the second transfer roller 22 and the backing roller 25. The unfixed toner images held on the intermediate transfer belt 15 are electrostatically transferred to the paper sheet K collectively in the second transfer section 20, which is pressurized by the second transfer roller 22 and the backing roller 25.

The paper sheet K on which the toner images have been electrostatically transferred is subsequently removed from the intermediate transfer belt 15 and immediately transported by the second transfer roller 22 to the transport belt 55, which is disposed downstream of the second transfer roller 22 in the direction in which paper sheets are transported. The transport belt 55 transports the paper sheet K to the fixing device 60 in accordance with the transportation speed optimum for the fixing device 60. The unfixed toner images present on the paper sheet K transported to the fixing device 60 are fixed to the paper sheet K by heat and pressure in the fixing device 60. The paper sheet K on which the fixed image has been formed is transported to a paper eject tray (not illustrated) disposed in an ejecting section of the image forming apparatus.

Toner particles that remain on the intermediate transfer belt 15 after the termination of the transfer to the paper sheet K are transported to the cleaning section due to the rotation of the intermediate transfer belt 15 and removed from the intermediate transfer belt 15 by the cleaning backing roller 34 and the intermediate transfer belt cleaning member 35.

The exemplary embodiments are described above. It should be understood that the above-described exemplary embodiments are not restrictive, and many modifications, variations, and improvements may be made to the exemplary embodiments.

EXAMPLES

Examples of the exemplary embodiment of the present disclosure are described below. Note that, the exemplary embodiment of the present disclosure is not limited by Examples below. In the following description, "part" and "%" are all on a mass basis.

Example 1

A PI precursor solution is prepared by dissolving polyamic acid that is a polymer of 3,3',4,4'-biphenyltetracarboxylic dianhydride and 4,4'-diaminodiphenyl ether in N-methyl-2-pyrrolidone (NMP). The PI precursor solution used is a solution in which the solid content of a polyimide resin produced by imidization of the polyamic acid is 18% by mass.

Carbon black "FW200" produced by Orion Engineered Carbons S.A. (average particle size: 13 nm) is added to the PI precursor solution such that the amount of the carbon black is 19 parts by mass relative to 100 parts by mass of the solid content of the polyamic acid. The resulting mixture is stirred to form a carbon black-dispersed PI precursor solution.

The carbon black-dispersed PI precursor solution is ejected onto the outer surface of an aluminum cylindrical body through a dispenser at a width of 500 mm while the cylindrical body is rotated.

Subsequently, drying is performed by heating at 140° C. for 30 minutes while the cylindrical body is kept horizontal. Heating is performed for 120 minutes such that the maximum temperature is 320° C. The resulting single-layer body consisting of a polyimide resin layer having a thickness of 100 μm is cut to a width of 363 mm.

The surface (i.e., outer peripheral surface) of the single-layer body consisting of a polyimide resin layer is irradiated with excimer light in the atmospheric environment under the condition A (excimer light source "MUBK20-17XE" produced by Sen Engineering Co., Ltd. having a wavelength of 172 nm) while irradiation conditions are adjusted such that the integrated amount of light is 4,000 mJ/$cm^2$, in order to perform a surface quality imparting treatment.

An intermediate transfer belt is prepared by the above-described steps.

Examples 2 to 26 and Comparative Examples 1 to 5

An intermediate transfer belt is prepared as in Example 1, except that the conditions under which the surface quality imparting treatment is performed, the type of the resin used, the type and amount of the carbon black used, etc. are changed as described in Table 1.

The meanings of the abbreviations used for expressing the types of resin in Table 1 are as follows.

PI: Polyimide resin

PAI: Polyamide imide resin

PPS: Polyphenylene sulfide resin

PEEK: Polyether ether ketone resin

Evaluations

Properties

The following properties of the intermediate transfer belt (i.e., resin layer) are determined in accordance with the above-described methods.

Arithmetic average surface height Sa of surface

Maximum height Sz of surface

Depth of regular recesses formed in surface

Interval of regular recesses formed in surface

Surface hardness

Cleanability

The intermediate transfer belt is attached to an image forming apparatus "ApeosPro C810" produced by FUJIFILM Business Innovation Corp.

A band-like image quality pattern having an output-direction length of 320 mm and a width of 30 mm is formed on 50,000 A3-size recording paper sheets at 28° C. and 85% RH at an image density of 100%. Subsequently, whether or not streaks due to faulty cleaning are present on the printed paper sheets is determined. Furthermore, whether deposits are present on the surface of the intermediate transfer belt is determined using a microscope, in order to evaluate the cleanability of the intermediate transfer belt. The evaluation criteria used are as follows.

A: The streaks are absent visually, and the deposits are absent on the surface of the intermediate transfer belt.

B: The streaks are absent visually, but the deposits are present on the surface of the intermediate transfer belt.

C: 1 to 5 streaks are confirmed visually, and the deposits are present on the surface of the intermediate transfer belt.

D: 6 or more streaks are confirmed visually, and the deposits are present on the surface of the intermediate transfer belt.

Durability of Cleanability

As in the evaluation of cleanability, the intermediate transfer belt is attached to an image forming apparatus "ApeosPro C810" produced by FUJIFILM Business Innovation Corp. A band-like image quality pattern having an output-direction length of 320 mm and a width of 30 mm is formed on 400,000 A3-size recording paper sheets at an image density of 100%. Subsequently, whether or not streaks due to faulty cleaning are present on the printed paper sheets is determined. Furthermore, whether deposits are present on the surface of the intermediate transfer belt is determined using a microscope, in order to evaluate the durability of cleanability of the intermediate transfer belt. The evaluation criteria used are the same as those used in the evaluation of cleanability.

Transfer Efficiency

The intermediate transfer belt is attached to an image forming apparatus "ApeosPro C810" produced by FUJIFILM Business Innovation Corp.

An image including an array of cyan solid (100%) 3 cm×3 cm patches is printed in a normal-temperature normal-humidity (22° C./55% RH) environment. In the second transfer, hard stop is performed and the weight a of the toner deposited on the intermediate transfer belt prior to the second transfer and the weight b of the toner deposited on the intermediate transfer belt subsequent to the second transfer are measured. The transfer efficiency of the intermediate transfer belt is determined using the following formula.

$$\text{Transfer efficiency } \eta(\%)=(a-b)/a\times 100$$

The evaluation criteria used are as follows.

A: The transfer efficiency is 98% or more.

B: The transfer efficiency is 95% or more and less than 98%.

C: The transfer efficiency is 90% or more and less than 95%.

D: The transfer efficiency is less than 90%.

| | Resin layer | | | | Intermediate transfer belt (Polyimide resin layer) | | | | | Evaluations | | | |
|---|---|---|---|---|---|---|---|---|---|---|---|---|---|
| | | Carbon black | | | | | | | | | | | |
| | Resin type PI | Average particle size nm | Amount % (with respect to resin) | Surface quality imparting treatment | Arithmetic average surface height Sa µm | Maximum height Sz µm | Depth of regular recesses A µm | Interval of regular recesses B µm | B/A | Surface hardness MPa | Cleanability | Durability of cleanability | Transfer efficiency |
| Example 1 | PI | 13 | 22.0 | Condition A (Integrated amount of light: 4000 mJ/cm$^2$) | 0.0175 | 0.1100 | 0.0920 | 0.52 | 5.7 | 6800 | A | A | B |
| Example 2 | PI | 9 | 13.0 | Condition B (Integrated amount of light: 5200 mJ/cm$^2$) | 0.0170 | 0.1320 | 0.0820 | 0.48 | 5.8 | 6500 | A | A | A |
| Example 3 | PI | 9 | 12.0 | Condition A (Integrated amount of light: 4000 mJ/cm$^2$) | 0.0068 | 0.0680 | 0.0612 | 0.34 | 5.5 | 6400 | A | A | A |
| Example 4 | PI | 9 | 11.0 | Condition C (Integrated amount of light: 2000 mJ/cm$^2$) | 0.0051 | 0.0620 | 0.0515 | 0.34 | 6.6 | 6200 | B | B | B |
| Example 5 | PI | 25 | 23.0 | Condition C (Integrated amount of light: 2000 mJ/cm$^2$) | 0.0190 | 0.1550 | 0.0650 | 0.72 | 11.1 | 6500 | B | B | A |
| Example 6 | PI | 9 | 11.0 | Condition A (Integrated amount of light: 4000 mJ/cm$^2$) | 0.0072 | 0.0520 | 0.0650 | 0.35 | 5.4 | 6150 | B | B | A |
| Example 7 | PI | 25 | 23.0 | Condition B (Integrated amount of light: 5200 mJ/cm$^2$) | 0.0172 | 0.1980 | 0.0720 | 0.65 | 9.0 | 6600 | B | B | B |
| Example 8 | PI | 13 | 22.0 | Condition C (Integrated amount of light: 2000 mJ/cm$^2$) | 0.0165 | 0.1050 | 0.0520 | 0.21 | 4.0 | 6700 | B | B | B |
| Example 9 | PI | 13 | 21.0 | Condition C (Integrated amount of light: 2000 mJ/cm$^2$) | 0.0175 | 0.1500 | 0.0510 | 0.65 | 12.7 | 6700 | B | B | B |
| Example 10 | PI | 25 | 24.0 | Condition D (Integrated amount of light: 6200 mJ/cm$^2$) | 0.0192 | 0.1850 | 0.1800 | 0.75 | 4.2 | 6500 | B | B | B |
| Example 11 | PI | 9 | 12.0 | Condition D (Integrated amount of light: 6200 mJ/cm$^2$) | 0.0082 | 0.0500 | 0.2250 | 0.49 | 2.2 | 6600 | C | C | B |
| Example 12 | PI | 13 | 24.0 | Condition A (Integrated amount of light: 4000 mJ/cm$^2$) | 0.0185 | 0.1500 | 0.0680 | 0.21 | 3.1 | 6850 | B | B | B |
| Example 14 | PI | 9 | 12.0 | Condition B (Integrated amount of light: 5200 mJ/cm$^2$) | 0.0130 | 0.1250 | 0.0815 | 0.48 | 5.9 | 6200 | A | A | A |
| Example 15 | PI | 25 | 21.0 | Condition B (Integrated amount of light: 5200 mJ/cm$^2$) | 0.0172 | 0.1820 | 0.0750 | 0.78 | 10.4 | 6900 | B | B | B |
| Example 16 | PI | 9 | 10.0 | Condition E (Integrated amount of light: 7500 mJ/cm$^2$) | 0.0160 | 0.0820 | 0.2000 | 0.20 | 1.0 | 6400 | A | A | B |
| Example 17 | PI | 9 | 10.0 | Condition D (Integrated amount of light: 6200 mJ/cm$^2$) | 0.0093 | 0.0550 | 0.1400 | 0.21 | 1.5 | 6300 | A | A | A |
| Example 18 | PI | 13 | 21.0 | Condition F (Integrated amount of light: 3300 mJ/cm$^2$) | 0.0170 | 0.1230 | 0.0610 | 0.61 | 10.0 | 7600 | A | A | A |
| Example 19 | PI | 25 | 22.0 | Condition C (Integrated amount of light: 2000 mJ/cm$^2$) | 0.0175 | 0.1550 | 0.0501 | 0.80 | 15.9 | 6350 | B | B | A |
| Example 20 | PI | 8 | 10.0 | Condition B (Integrated amount of light: 5200 mJ/cm$^2$) | 0.0150 | 0.0550 | 0.0510 | 0.25 | 4.9 | 5500 | A | A | C |
| Example 21 | PI | 9 | 11.0 | Condition B (Integrated amount of light: 5200 mJ/cm$^2$) | 0.0180 | 0.0600 | 0.0650 | 0.53 | 8.2 | 6400 | A | A | A |
| Example 22 | PI | 25 | 22.0 | Condition B (Integrated amount of light: 5200 mJ/cm$^2$) | 0.0170 | 0.1500 | 0.0700 | 0.65 | 9.3 | 6200 | B | B | B |
| Example 23 | PI | 30 | 25.0 | Condition B (Integrated amount of light: 5200 mJ/cm$^2$) | 0.0190 | 0.1900 | 0.0850 | 0.78 | 9.2 | 6500 | C | C | B |

-continued

| | Resin layer | Carbon black | | | Intermediate transfer belt (Polyimide resin layer) | | | | | Evaluations | | | |
|---|---|---|---|---|---|---|---|---|---|---|---|---|---|
| | Resin type PI | Average particle size nm | Amount % (with respect to resin) | Surface quality imparting treatment | Arithmetic average surface height Sa µm | Maximum height Sz µm | Depth of regular recesses A µm | Interval of regular recesses B µm | B/A | Surface hardness MPa | Cleanability | Durability of cleanability | Transfer efficiency |
| Example 24 | PAI | 13 | 21.0 | Condition F (Integrated amount of light: 3300 mJ/cm$^2$) | 0.0165 | 0.1230 | 0.0866 | 0.61 | 7.0 | 7200 | A | A | A |
| Example 25 | PPS | 25 | 22.0 | Condition A (Integrated amount of light: 4000 mJ/cm$^2$) | 0.0190 | 0.1550 | 0.0555 | 0.72 | 13.0 | 3700 | A | D | B |
| Example 26 | PEEK | 25 | 21.0 | Condition A (Integrated amount of light: 4000 mJ/cm$^2$) | 0.0180 | 0.1620 | 0.0620 | 0.72 | 11.6 | 5500 | A | B | B |
| Comparative example 1 | PI | 9 | 8 | Condition C (Integrated amount of light: 2000 mJ/cm$^2$) | 0.0038 | 0.0510 | 0.0520 | 0.35 | 6.7 | 6150 | D | D | B |
| Comparative example 2 | PI | 25 | 25 | Condition E (Integrated amount of light: 7500 mJ/cm$^2$) | 0.0350 | 0.3200 | 0.3500 | 0.75 | 2.1 | 6600 | D | D | B |
| Comparative example 3 | PI | 9 | 13 | No irradiation | 0.0046 | 0.0420 | 0.0200 | 0 | 0.0 | 6450 | D | D | D |
| Comparative example 4 | PI | 25 | 21 | Condition E (Integrated amount of light: 7500 mJ/cm$^2$) | 0.0170 | 0.1800 | 0.1500 | 0.91 | 6.1 | 6700 | D | D | D |
| Comparative example 5 | PI | 25 | 23 | Grinding with lapping film | 0.0065 | 0.0072 | 0.0650 | 1.5 | 23.1 | 6800 | D | D | D |

The above results confirm that the intermediate transfer belts prepared in Examples have higher cleanability than the intermediate transfer belts prepared in Comparative Examples.

It is also confirmed that the intermediate transfer belts prepared in Examples also have a higher transfer efficiency than the intermediate transfer belts prepared in Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An intermediate transfer belt comprising:

a single-layer body including a resin layer or a multilayer body including the resin layer serving as a top surface layer, wherein a surface of the resin layer has an arithmetic average surface height Sa of 0.005 µm or more and 0.020 µm or less, wherein the surface of the resin layer has a maximum height Sz of 0.050 µm or more and 0.200 µm or less, and wherein the surface of the resin layer has recesses having a depth of 0.050 µm or more, the recesses being arranged at a regular interval, and the interval of the recesses is 0.20 µm or more and 0.80 µm or less.

2. The intermediate transfer belt according to claim 1, wherein the interval of the recesses is 0.30 µm or more and 0.50 µm or less.

3. The intermediate transfer belt according to claim 1, wherein a ratio of the interval of the recesses to the depth of the recesses (recess interval/recess depth) is 1.0 or more and 16.0 or less.

4. The intermediate transfer belt according to claim 2, wherein a ratio of the interval of the recesses to the depth of the recesses (recess interval/recess depth) is 1.0 or more and 16.0 or less.

5. The intermediate transfer belt according to claim 3, wherein the ratio of the interval of the recesses to the depth of the recesses (recess interval/recess depth) is 1.5 or more and 10.0 or less.

6. The intermediate transfer belt according to claim 4, wherein the ratio of the interval of the recesses to the depth of the recesses (recess interval/recess depth) is 1.5 or more and 10.0 or less.

7. An intermediate transfer belt comprising:

a single-layer body including a resin layer or a multilayer body including the resin layer serving as a top surface layer, wherein a surface of the resin layer has an arithmetic average surface height Sa of 0.005 μm or more and 0.020 μm or less, wherein the surface of the resin layer has a maximum height Sz of 0.050 μm or more and 0.200 μm or less, and wherein the surface of the resin layer has recesses having a depth of 0.050 μm or more, the recesses being arranged at a regular interval, and a ratio of the interval of the recesses to the depth of the recesses (recess interval/recess depth) is 1.0 or more and 16.0 or less.

8. The intermediate transfer belt according to claim 7, wherein the ratio of the interval of the recesses to the depth of the recesses (recess interval/recess depth) is 1.5 or more and 10.0 or less.

9. The intermediate transfer belt according to claim 7, wherein the interval of the recesses is 0.20 μm or more and 0.80 μm or less.

10. The intermediate transfer belt according to claim 8, wherein the interval of the recesses is 0.20 μm or more and 0.80 μm or less.

11. The intermediate transfer belt according to claim 9, wherein the interval of the recesses is 0.30 μm or more and 0.50 μm or less.

12. The intermediate transfer belt according to claim 10, wherein the interval of the recesses is 0.30 μm or more and 0.50 μm or less.

13. The intermediate transfer belt according to claim 1, wherein the depth of the recesses arranged at the regular interval is 0.050 μm or more and 0.200 μm or less.

14. The intermediate transfer belt according to claim 2, wherein the depth of the recesses arranged at the regular interval is 0.050 μm or more and 0.200 μm or less.

15. The intermediate transfer belt according to claim 3, wherein the depth of the recesses arranged at the regular interval is 0.050 μm or more and 0.200 μm or less.

16. The intermediate transfer belt according to claim 1, wherein a surface hardness of the resin layer is 5,000 MPa or more, the surface hardness being measured by a nanoindentation method.

17. The intermediate transfer belt according to claim 1, wherein the resin layer includes conductive carbon particles.

18. The intermediate transfer belt according to claim 17, wherein the conductive carbon particles have an average size of 9 nm or more and 25 nm or less.

19. A transfer device comprising:

an intermediate transfer belt having an outer peripheral surface onto which a toner image is transferred, the intermediate transfer belt being the intermediate transfer belt according to claim 1;

a first transfer device including a first transfer member that transfers a toner image formed on a surface of an image holding member onto the outer peripheral surface of the intermediate transfer belt as first transfer;

a second transfer device including a second transfer member arranged to contact with the outer peripheral surface of the intermediate transfer belt, the second transfer member transferring the toner image transferred on the outer peripheral surface of the intermediate transfer belt onto a surface of a recording medium as second transfer; and a cleaning device including a cleaning member that cleans the outer peripheral surface of the intermediate transfer belt.

20. An image forming apparatus comprising:

a toner image formation device including an image holding member, the toner image formation device forming a toner image on a surface of the image holding member; and a transfer device that transfers the toner image formed on the surface of the image holding member onto a surface of a recording medium, the transfer device being the transfer device according to claim 19.

* * * * *